US011850790B2

(12) United States Patent
Mukherjee et al.

(10) Patent No.: US 11,850,790 B2
(45) Date of Patent: Dec. 26, 2023

(54) SYSTEM AND METHOD FOR MICROWAVE VOLUMETRIC ADDITIVE MANUFACTURING

(71) Applicant: Lawrence Livermore National Security, LLC, Livermore, CA (US)

(72) Inventors: Saptarshi Mukherjee, Milpitas, CA (US); Tammy Chang, San Ramon, CA (US); Joseph W. Tringe, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/518,115

(22) Filed: Nov. 3, 2021

(65) Prior Publication Data

US 2023/0135458 A1 May 4, 2023

(51) Int. Cl.
*B29C 64/129* (2017.01)
*B29C 64/241* (2017.01)
(Continued)

(52) U.S. Cl.
CPC .......... *B29C 64/129* (2017.08); *B29C 64/241* (2017.08); *B29C 64/245* (2017.08);
(Continued)

(58) Field of Classification Search
CPC ... B29C 64/129; B29C 64/264; B29C 64/245; B29C 64/393; B29C 64/386;
(Continued)

(56) References Cited

U.S. PATENT DOCUMENTS

| 5,009,102 A | 4/1991 | Afromowitz |
| 2006/0044555 A1 | 3/2006 | Wang et al. |

(Continued)

FOREIGN PATENT DOCUMENTS

| CN | 106273477 A | 1/2017 |
| CN | 109752401 A | 5/2019 |

(Continued)

OTHER PUBLICATIONS

Kelly, B.E., Bhattacharya, I., Heidari, H., Shusteff, M., Spadaccini, C. M., and Taylor, H. K., 2019. Volumetric additive manufacturing via tomographic reconstruction. Science, 363 (6431), pp. 1075-1079.

(Continued)

*Primary Examiner* — Joseph S Del Sole
*Assistant Examiner* — Lawrence D. Hohenbrink, Jr.
(74) *Attorney, Agent, or Firm* — HARNESS, DICKEY & PIERCE, P.L.C.

(57) ABSTRACT

The present disclosure relates to a volumetric additive manufacturing system for forming a structure from a volume of resin using microwave energy. The system makes use of an electronic controller and at least one beam forming algorithm accessible by the electronic controller for generating information relating to an amplitude and a time delay for forming a microwave signal, where the microwave signal will be used in irradiating a build volume, and where the build volume is formed by the volume of resin. A microwave signal generating subsystem is included which is responsive to the information generated by the beam forming algorithm, and which generates a microwave signal using the amplitude and the time delay determined by the beam forming algorithm. An antenna is used to receive the microwave signal and project the microwave signal as a microwave beam, in (Continued)

accordance with the amplitude and time delay, into the build volume to form the structure.

20 Claims, 4 Drawing Sheets

(51) Int. Cl.
| B29C 64/245 | (2017.01) |
| B33Y 50/02 | (2015.01) |
| B29C 64/393 | (2017.01) |
| B33Y 10/00 | (2015.01) |
| B33Y 30/00 | (2015.01) |
| B29C 64/264 | (2017.01) |
| B33Y 50/00 | (2015.01) |

(52) U.S. Cl.
CPC .......... *B29C 64/264* (2017.08); *B29C 64/393* (2017.08); *B33Y 10/00* (2014.12); *B33Y 30/00* (2014.12); *B33Y 50/02* (2014.12); *B33Y 50/00* (2014.12)

(58) Field of Classification Search
CPC ....... B29C 64/241; B33Y 10/00; B33Y 30/00; B33Y 50/00; B33Y 50/02
USPC .......................................................... 264/401
See application file for complete search history.

(56) References Cited

U.S. PATENT DOCUMENTS

| 2009/0051935 | A1 | 2/2009 | Cooper |
| 2017/0090462 | A1 | 3/2017 | Dave et al. |
| 2018/0015672 | A1* | 1/2018 | Shusteff ............... G03H 1/0005 |
| 2018/0250890 | A1 | 9/2018 | Claussen et al. |
| 2019/0016052 | A1* | 1/2019 | Clark .................... B33Y 10/00 |
| 2019/0259146 | A1 | 8/2019 | Hunt |
| 2020/0173964 | A1 | 6/2020 | Hudson et al. |
| 2021/0129423 | A1 | 5/2021 | Matusik et al. |
| 2021/0146628 | A1 | 5/2021 | Panas |
| 2021/0291460 | A1 | 9/2021 | Clark |

FOREIGN PATENT DOCUMENTS

| EP | 3459716 A1 | 3/2019 |
| WO | WO-2017197388 A1 | 11/2017 |

OTHER PUBLICATIONS

Shusteff, M., Browar, A. E., Kelly, B. E., Henriksson, J., Weisgraber, T. H., Panas, R. M., Fang, N. X. and Spadaccini, C. M., 2017. One-step volumetric additive manufacturing of complex polymer structures. Science advances, 3(12), p. eaao5496.

Kumar, A., Kuang, Y., Liang, Z. and Sun, X., 2020. Microwave chemistry, recent advancements and eco-friendly microwave-assisted synthesis of nanoarchitectures and their applications: A review. Materials Today Nano, 11, p. 100076.

Boey, F.Y.C. and Yap, B.H., 2001. Microwave curing of an epoxy-amine system: effect of curing agent on the glass-transition temperature. Polymer testing, 20(8), pp. 837-845.

Tanrattanakul, V. and SaeTiaw, K., 2005. Comparison of microwave and thermal cure of epoxy-anhydride resins: Mechanical properties and dynamic characteristics. Journal of Applied Polymer Science, 97(4), pp. 1442-1461.

Zhao, J., Yang, Y. and Li, L., 2020. A comprehensive evaluation for different post-curing methods used in stereolithography additive manufacturing. Journal of Manufacturing Processes, 56, pp. 867-877.

Sweeney, C.B., Lackey, B.A., Pospisil, M.J., Achee, T.C., Hicks, V.K., Moran, A.G., Teipel, B.R., Saed, M.A. and Green, M.J., 2017. Welding of 3D-printed carbon nanotube-polymer composites by locally induced microwave heating. Science advances, 3(6), p. e1700262.

Odom, M.G., Sweeney, C.B., Parviz, D., Sill, L.P., Saed, M.A. and Green, M.J., 2017. Rapid curing and additive manufacturing of thermoset systems using scanning microwave heating of carbon nanotube/epoxy composites. Carbon, 120, pp. 447-453.

Iliopoulos, A.P., Michopoulos, J.G., Steuben, J.C., Birnbaum, A.J., Graber, B.D., Rock, B.Y., Johnson, L.A. and Gorzkowski, E.P., Aug. 2019. Towards Selective Volumetric Additive Manufacturing and Processing of Ceramics. In International Design Engineering Technical Conferences and Computers and Information in Engineering Conference (vol. 59179, p. V001T02A036). American Society of Mechanical Engineers.

Ebner, C., Bodner, T., Stelzer, F. and Wiesbrock, F., 2011. One Decade of Microwave-Assisted Polymerizations: Quo vadis ?. Macromolecular rapid communications, 32(3), pp. 254-288.

Damien Loterie et al. "Volumetric 3D Printing of Elastomers by Tomographic Back-Projection", https: www.researchgate.net/publication/328956954 (2018), 10 pages.

Computed Axial Lithography (CAL): Toward Single Step 3D Printing of Arbitrary Geometries, https://arxiv.org/abs/1705.05893v1, May 16, 2017, 10 pages.

International Search Report and Written Opinion regarding International Application No. PCT/US2020/053917, dated Mar. 26, 2021.

International Search Report and Written Opinion, International Application No. PCT/US2022/047358, dated Feb. 22, 2023, 7 pages.

* cited by examiner

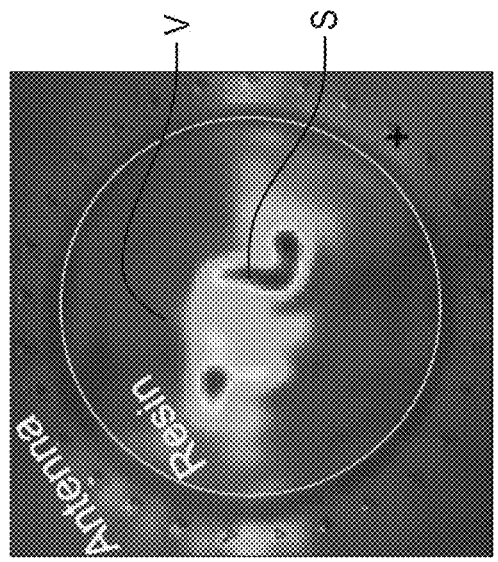
FIG. 2b Rotation: 40°
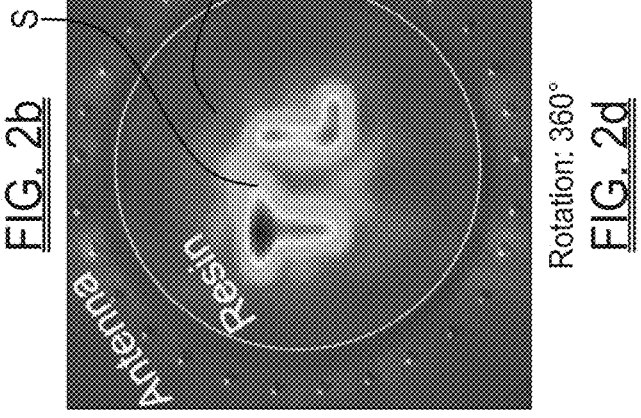
FIG. 2d Rotation: 360°
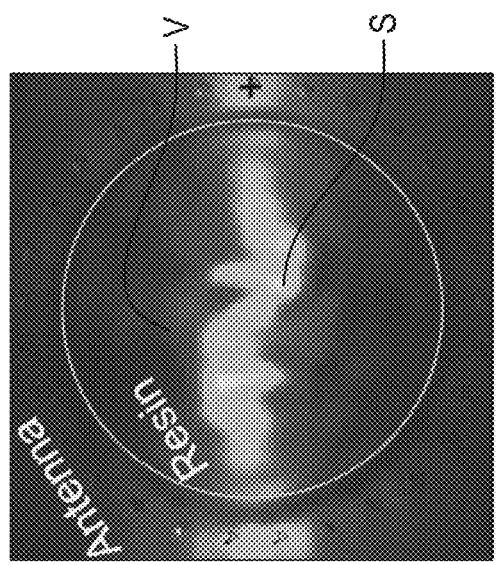
FIG. 2a Rotation: 0°
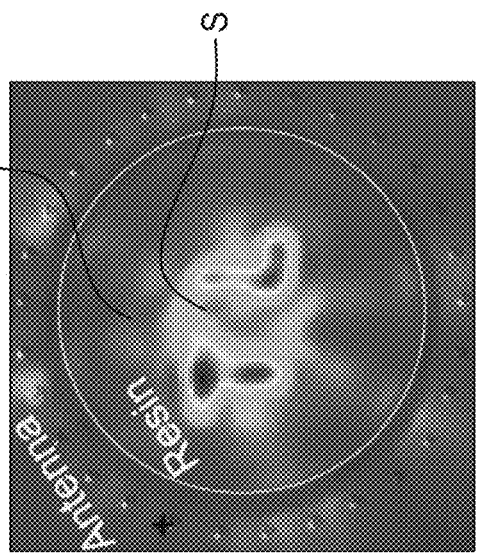
FIG. 2c Rotation: 190°

SYSTEM AND METHOD FOR MICROWAVE VOLUMETRIC ADDITIVE MANUFACTURING

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to volumetric additive manufacturing systems and methods, and more particularly to a volumetric additive manufacturing system and method that deposits microwave energy in feedstock materials to effect curing and solidification of the feedstock materials to enable forming 3D structures.

BACKGROUND

The statements in this section merely provide background information related to the present disclosure and may not constitute prior art.

Recent years have seen rapid advancements in advanced manufacturing techniques. An advanced volumetric additive manufacturing (VAM) technique that relies on rotating a photosensitive resin in a dynamically evolving light field has been recently developed (see, e.g., Kelly, B. E., Bhattacharya, I., Heidari, H., Shusteff, M., Spadaccini, C. M. and Taylor, H. K., 2019, "Volumetric additive manufacturing via tomographic reconstruction", Science, 363(6431), pp. 1075-1079, and also Shusteff, M., Browar, A. E., Kelly, B. E., Henriksson, J., Weisgraber, T. H., Panas, R. M., Fang, N. X. and Spadaccini, C. M., 2017, One-step volumetric additive manufacturing of complex polymer structures, Science advances, 3(12), p.eaao5496.

Unlike most AM processes that print point-by-point voxels serially to build up the 3D volume, such as fused deposition modeling or ink-jetting, the biggest advantage of the VAM approach is the capability to print arbitrarily defined 3D geometries as a unit operation, with no substrate or support structures required. However, the current technique is limited to transparent photosensitive liquid resins due to the high attenuation of light waves in optically opaque materials. Techniques which extend the material space to include translucent and opaque materials would enable VAM to be more broadly used for all material types. This could include particle additives such as piezoresistive and conductive carbon black, modulus-strengthening ceramics, and chemically active inorganic catalysts. In addition, microwave-assisted VAM may also enable accessing resin chemistries that are not currently possible through photo-mediated VAM polymerization mechanisms such as step-growth polymerizations of polyamides, ring-opening polymerizations of polycaprolactone, and controlled free-radical polymerizations (see e.g., Kumar, A., Kuang, Y., Liang, Z. and Sun, X., 2020, "Microwave chemistry, recent advancements and eco-friendly microwave-assisted synthesis of nanoarchitectures and their applications: A review", Materials Today Nano, p. 100076.

While microwave curing has been deployed for polymer curing, the techniques have primarily been used for the bulk curing of polymer samples. Prior work using microwave heating of epoxy resins using a conventional microwave oven has shown faster curing times and better mechanical properties than thermal heating (see, e.g., Boey, F. Y. C. and Yap, B. H., 2001, "Microwave curing of an epoxy-amine system: effect of curing agent on the glass-transition temperature", Polymer testing, 20(8), pp. 837-845; see also Tanrattanakul, V. and SaeTiaw, K., 2005, "Comparison of microwave and thermal cure of epoxy-anhydride resins: Mechanical properties and dynamic characteristics", Journal of Applied Polymer Science, 97(4), pp. 1442-1461). Microwave heating of epoxy resins has also shown less dimension variations, and more cost-effectiveness in comparison to ultraviolet chamber curing (see, e.g., Zhao, J., Yang, Y. and Li, L., 2020, "A comprehensive evaluation for different post-curing methods used in stereolithography additive manufacturing", Journal of Manufacturing Processes, 56, pp. 867-877.

In contrast to X-ray based heating, the ability of microwave energy to penetrate through thick, optically opaque materials and produce rapid (<1 min), intense volumetric heating (kW), with large sample area coverages (meters) makes it an ideal candidate (see, e.g., Sweeney, C. B., Lackey, B. A., Pospisil, M. J., Achee, T. C., Hicks, V. K., Moran, A. G., Teipel, B. R., Saed, M. A. and Green, M. J., 2017, "Welding of 3D-printed carbon nanotube-polymer composites by locally induced microwave heating," Science advances, 3(6), p.e1700262.

Rapid curing of polymer thermoset systems using scanned microwave heating of carbon nanotube/epoxy composites has been achieved in (see, e.g., Odom, M. G., Sweeney, C. B., Parviz, D., Sill, L. P., Saed, M. A. and Green, M. J., 2017, "Rapid curing and additive manufacturing of thermoset systems using scanning microwave heating of carbon nanotube/epoxy composites," Carbon, 120, pp. 447-453.

Initial simulation studies on shaping microwave beams using a single microwave applicator for ceramics are promising but lack a computational model for optimizing the microwave absorption rates. The use of a single microwave applicator also requires inverse design of the applicator geometry for each new part, which is needed to generate different beam shapes corresponding to different geometries (see, e.g., Iliopoulos, A. P., Michopoulos, J. G., Steuben, J. C., Birnbaum, A. J., Graber, B. D., Rock, B. Y., Johnson, L. A. and Gorzkowski, E. P., 2019, August, "Towards Selective Volumetric Additive Manufacturing and Processing of Ceramics," In International Design Engineering Technical Conferences and Computers and Information in Engineering Conference (Vol. 59179, p. V001T02A036), American Society of Mechanical Engineers).

In view of the foregoing, there remains a definite need for improvements with 3D volumetric printing technology. Improvements that are able to dramatically reduce the time needed to print 3D parts using a VAM system would further serve to open VAM to areas where traditional VAM printing techniques are too time consuming to implement or too cost inefficient. The ability to use VAM with optically opaque materials would also open VAM to use with a wide variety of differing part manufacturing applications where the part needs to be made from some material that is optically opaque.

SUMMARY

This section provides a general summary of the disclosure, and is not a comprehensive disclosure of its full scope or all of its features.

In one aspect the present disclosure relates to a volumetric additive manufacturing system for forming a structure from a volume of resin using microwave energy. The system may comprise an electronic controller and at least one beam forming algorithm accessible by the electronic controller. The beam forming algorithm may be used for generating information relating to an amplitude and a time delay for forming a microwave signal to be used in irradiating a build volume, where the build volume is formed by the volume of resin. A microwave signal generating subsystem may also be included which is responsive to the information generated by the beam forming algorithm for generating a microwave signal using the amplitude and the time delay determined by the beam forming algorithm. An antenna may also be included for receiving the microwave signal and projecting the microwave signal as a microwave beam, in accordance with the amplitude and time delay, into the build volume to form the structure.

In another aspect the present disclosure relates to a volumetric additive manufacturing system for forming a structure using a volume of resin representing a build volume, the volume of resin being responsive to microwave energy exposure which thermally cures the resin. The system may comprise an electronic controller, a memory accessible by the electronic controller and a beam forming algorithm stored in the memory. The beam forming algorithm may be used for generating information relating to an amplitude and a time delay to be used in forming a plurality of microwave signals, where each one of the microwave signals is calculated by the beam forming algorithm taking into account an angular orientation at which each microwave signal will be projected into the build volume. A microwave signal generating subsystem may also be included which is responsive to the information generated by the beam forming algorithm for generating electrical pulses to be used in forming the plurality of microwave signals. Each one of the electrical pulses carries specific amplitude information and specific time delay information calculated by the beam forming algorithm. A microwave antenna array may also be included which is responsive to the electrical pulses, and configured to include a plurality of independent microwave antennas arranged at predetermined, specific angular orientations around the build volume. Each one of the plurality of microwave antennas is configured to receive at least one of the electrical pulses and to project therefrom at least one of the plurality of microwave signals into the build volume to cure a portion of the volume of resin and help form the structure.

In still another aspect the present disclosure relates to a volumetric additive manufacturing method for forming a structure from a volume of resin using microwave energy. The method may comprise using an electronic controller to implement at least one beam forming algorithm for generating information relating to an amplitude and a time delay for each one of a plurality of microwave signals, where the plurality of microwave signals are to be used in irradiating a build volume formed by the volume of resin. The method may further include using the information generated by the beam forming algorithm to generate a plurality of electrical pulses which carry the amplitude and the time delay information. The method may further include using an antenna array for receiving the plurality of electrical pulses and to generate and project therefrom the plurality of microwave signals into the build volume to form the structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 2a-2d illustrate finite-difference time-domain simulations showing the results of a time-reversal focusing algorithm used by the system, and more particularly showing microwave energy localization according to a 'TL' shape as a volume of the resin is rotated while being exposed to the dynamic microwave fields produced from an antenna array subsystem of the system;

DETAILED DESCRIPTION

Example embodiments will now be described more fully with reference to the accompanying drawings.

Figure 1:
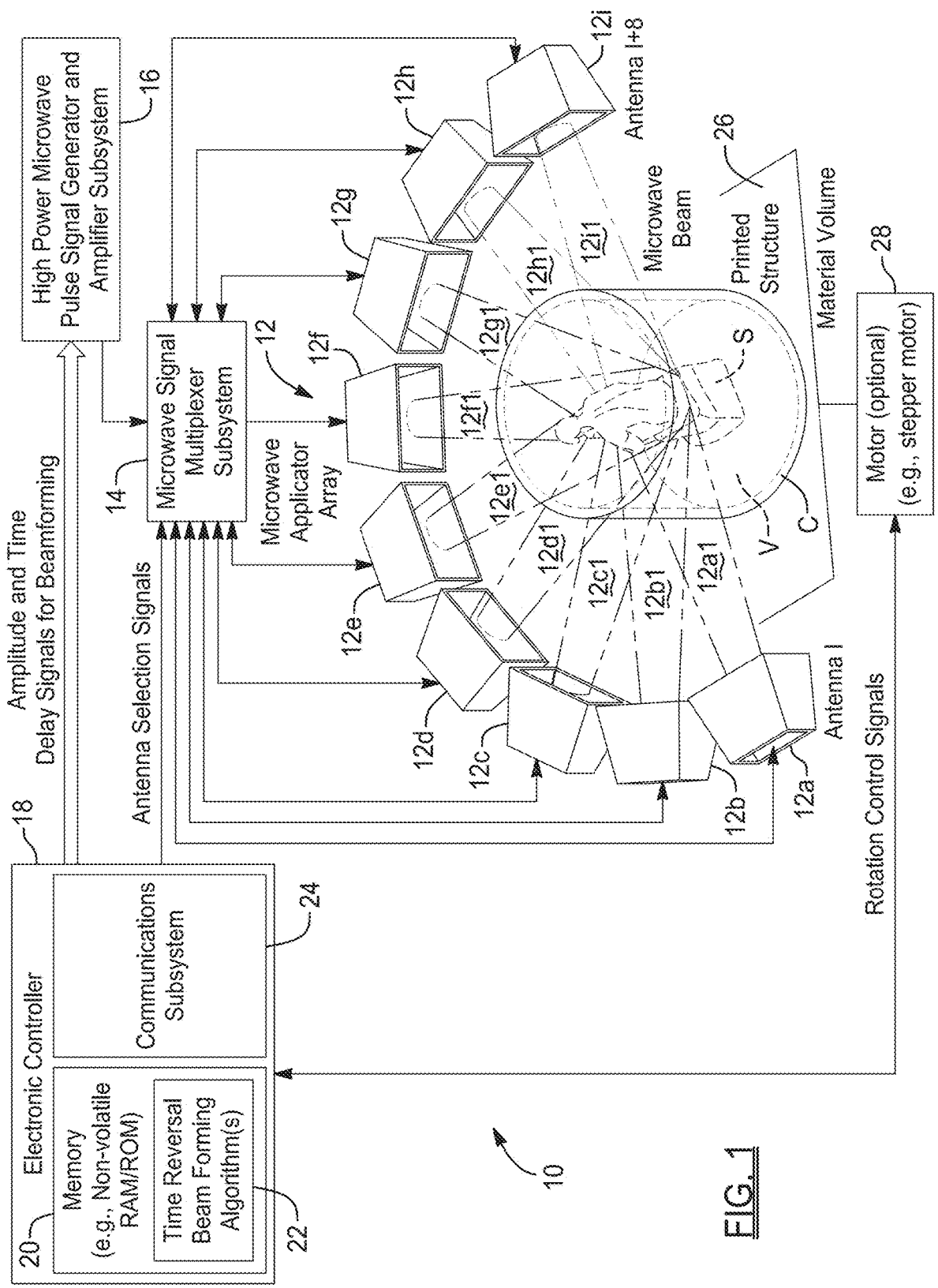
FIG. 1 is a high level block diagram of one embodiment of a microwave volumetric additive manufacturing (VAM) system in accordance with the present disclosure.

The present disclosure involves a new VAM system based on electromagnetic wave radiation focusing, and in one specific embodiment on microwave radiation focusing, which expands the VAM paradigm to optically opaque materials. One embodiment of the new VAM system 10 is shown in FIG. 1. A microwave applicator array subsystem, driven by a time-reversal beamforming algorithm, enables selective focusing of high-power microwave fields to deliver localized energy to arbitrary regions in a three-dimensional resin volume. This approach eliminates the need for inverse design of the applicator geometry for different beam shapes using the microwave array-based beam-forming approach. The high sensitivity of microwaves towards certain particles such as carbon nanotubes or iron nanofillers, which can be loaded in a polymer, enables the system 10 to be used in a wide variety of applications involving the development of novel functional electronic devices such as storage devices, metamaterials and piezo-resistive sensors, just to name a few new applications for a VAM-type system.

With further reference to FIG. 1, the system 10 in this example includes a microwave application array ("MAA") subsystem 12 which consists of a plurality of microwave antennas 12a-12i. The antennas 12a-12i may take any specific form suitable for transmitting microwave energy, but in one implementation the antennas 12a-12i are horn antennas. While nine such microwave antennas 12a-12i are shown in this example, the present system 10 is not limited to use with only nine such antennas, and it will be appreciated that a greater or lesser number of antennas may be employed. The antennas 12a-12i generate microwave beams 12a1-12i1 which each irradiate a volume V of feedstock material (e.g., resin) with microwave energy at predetermined, precise angular orientations. The feedstock material is thermally responsive to microwave energy, and does not need to be optically transparent, but instead may be partially or fully opaque. The MAA subsystem 12 is fed with a plurality of independent microwave signals from the outputs of a microwave signal multiplexer 14. The microwave signal multiplexer 14 in turn receives high power microwave pulses from a high power microwave pulse signal generator and amplifier subsystem ("MPSAG" subsystem) 16, as well as control signals from an electronic controller 18. The electronic controller 18 may be a microprocessor or microcontroller based system having an internal or external nonvolatile memory 20 (i.e., RAM, ROM, etc.). The memory 20 contains one or more time reversal beam forming algorithms 22 which are used to calculate the magnitude and time delay for each output pulse created by the microwave pulse generator 16. The output pulses produce microwave energy beams when emitted from specific ones of the antennas 12a-12i which have predetermined beam patterns, generated in accordance with the specific amplitude and time delay values calculated by the beam forming algorithm(s) 22, for specific ones of the antennas taking into account their known, predetermined angular positions, to activate (i.e., cure) specific 3D portions of the volume V of the resin being used to form a structure "S". A serial, parallel or other communications subsystem 24 may be used to help communicate the amplitude and time delay information to the microwave pulse generator 16, as well as to communicate the control signals (serial or parallel, but more typically serial in form) to the multiplexer subsystem 14, and further to communicate other control signals being applied to other optional components of the system that may be used to help control rotation of the build volume.

The MAA subsystem 12 in this example is shown with the antennas 12a-12i arranged in a semi-circle circumscribing one half (i.e., 180 degrees) of the volume V of resin. However, other arrangements of the antennas 12a-12i are possible as well, for example an arrangement of antennas fully circumscribing (i.e., full 360 degrees) the volume V of resin.

The volume V of resin is contained in a suitable container C which is supported on a stage 26. The stage 26 may be stationary, or optionally it may be supported for rotation and driven by a suitable prime mover, for example a stepper motor 28. Using a sufficient number of antennas within the MAA 12 to irradiate the volume V of resin from angles between 0-180 degrees eliminates the need to rotate the build volume as the volume V of resin is irradiated. However, configuring the stage 26 for rotation may allow the system 10 to be implemented with a fewer number of independent antennas, and potentially with only a single antenna, by controllably rotating the stage 26 and repeatedly irradiating the volume V of resin from different, precise predetermined angles with predetermined beam patterns projected from just one antenna 12, or from just a few antennas 12. In such an implementation, the stepper motor 28 may be controlled to precisely rotate the stage 26 via control signals supplied by the electronic controller 18 in real time into predetermined angular orientations relative to the one or more antennas being used.

The system 10, being a microwave energy based system, provides significant advantages over an optics based system. For one, the system 10 eliminates the need for digital projectors and replaces them the high-power MAA subsystem 12. Complex electric fields with varying magnitude and phase are radiated by the MAA subsystem 12 with the aid of the time reversal beam-steering algorithms 22 in order to focus microwave fields and deliver localized energy to arbitrary regions within the 3D volume V of the build volume.

Referring further to FIG. 1, the MPSAG 16 subsystem 16 in this example operates in the X-band and supplies microwave X-band signals to the MAA subsystem 12. The microwave beams 12a1-12i1 emitted by the antennas 12a-12i of the MAA subsystem 12 each have a focused near field radiation gain and spot size required in to provide an energy dose ranging from about 100-700 mJ/cm$^3$, and have power levels from 0.2-2 kW, and with a resolution less than 1 cm, which is necessary to perform VAM. By "resolution" it will be understood as meaning an area of less than 1 cm total. The microwave beams 12a1-12i1 are created using a time reversal beam-steering algorithm 22. The time reversal algorithm is based on the reciprocity theorem of electromagnetic waves (see, e.g., G. Lerosey, J. de Rosny, A. Tourin, A. Derode, G. Montaldo, and M. Fink, "*Time reversal of electromagnetic waves*," Phys. Rev. Lett., vol. 92, no. 19, p. 193904, 2004). Due to the time-symmetric nature of electromagnetic wave equations, a divergent wave, when reversed in time and back-propagated in space, can be converged back to the source location. This concept has been used to focus electromagnetic waves for a wide range of applications such as radar and wireless communications (see, e.g., R. C. Qiu, C. Zhou, N. Guo, and J. Q. Zhang, "*Time reversal with MISO for ultrawideband communications: Experimental results*," IEEE Antennas Wireless Propag. Lett., vol. 5, no. 1, pp. 269-273, December 2006; see also, e.g., S. Mukherjee, L. Udpa, S. Udpa, and E. J. Rothwell, "*Target Localization Using Microwave Time-Reversal Mirror in Reflection Mode*," IEEE Transactions on Antennas and Propagation Lett., vol. 65, no. 2, pp. 820-828, 2016.). The wave propagation is modeled using a two-dimensional finite-difference time-domain model, which is known in the art. Numerical simulations using the time reversal algorithm 22 are used to provide a specific needed magnitude and specific time delay needed which is fed from the controller 18 to the microwave subsystem 14 to focus the microwave beam 12a1-12i1 emitted from each of the antennas 12a-12i, respectively in, or on, arbitrary regions of the resin volume V.

In one implementation of the system 10, the resin volume V sample is placed at the center of the stage 26 and the stage 26 rotated, while the antennas 12a-12i illuminate the volume V of resin with the microwave beams 12a1-12i1 sequentially at various angles as rotation takes place. As noted above the MAA array 12 may consist of any number of antennas, and the time reversal beam forming algorithm 22 is used to compute the amplitude and time delay for each sample rotation position (i.e., each angular position of the antennas 12 being used) using the time reversal algorithms. The finite-difference time-domain numerical simulation results in FIGS. 2a-2d were produced using a quantity of resin of 6 cm in diameter, a dielectric constant of 6, and a conductivity of 0.1 S/m), and while rotating the volume V of resin while exposing the volume V to the dynamic microwave fields from the MAA 12, and where the dynamic microwave field had a center frequency of 10 GHz, and with 20 antennas being used for the MAA 12. FIGS. 2a-2d thus show simulations of the time evolved focused microwave energy as the polymer sample (indicated by resin volume V) rotates. Structure S gradually is formed, which in this example from an overhead perspective appears as the letters "T" and "L" with a short connecting section. These figures show how it is possible to tune the microwave energy deposition from the MAA 12, using the time reversal beam forming algorithm 22, to create a desired 3D structural shape within the 3D volume V of resin.

In another implementation, which is expected to be even more preferred, the stage 26 is stationary and the microwave beams 12a1-12i1 shown in FIG. 1 are applied virtually simultaneously to the volume V of resin. This enables the entire structure S to be formed as the beams irradiate the volume V of resin from the different, predetermined angles. In still another implementation, the beams 12a1-12i1 may be generated in some predetermined sequential order. Again, the precise manner as to how the beams 12a1-12i1 are applied (i.e., all at once or sequentially in some predetermined pattern) may depend in part on the specific structure being formed and/or its three dimensional shape.

It will also be appreciated that while the antennas 12a-12i are all shown arranged in a common horizontal plane, it is also possible that two or more of the antennas may be positioned at different elevational positions from one another, in other words spherically arranged around the build volume. It will be appreciated that the precise angular arrangement of the antennas of the MAA 12 around the volume V of the resin, as well as the precise number of antennas used, may be dictated in part by the application, including the complexity of the 3D structure being formed.

Figure 3:
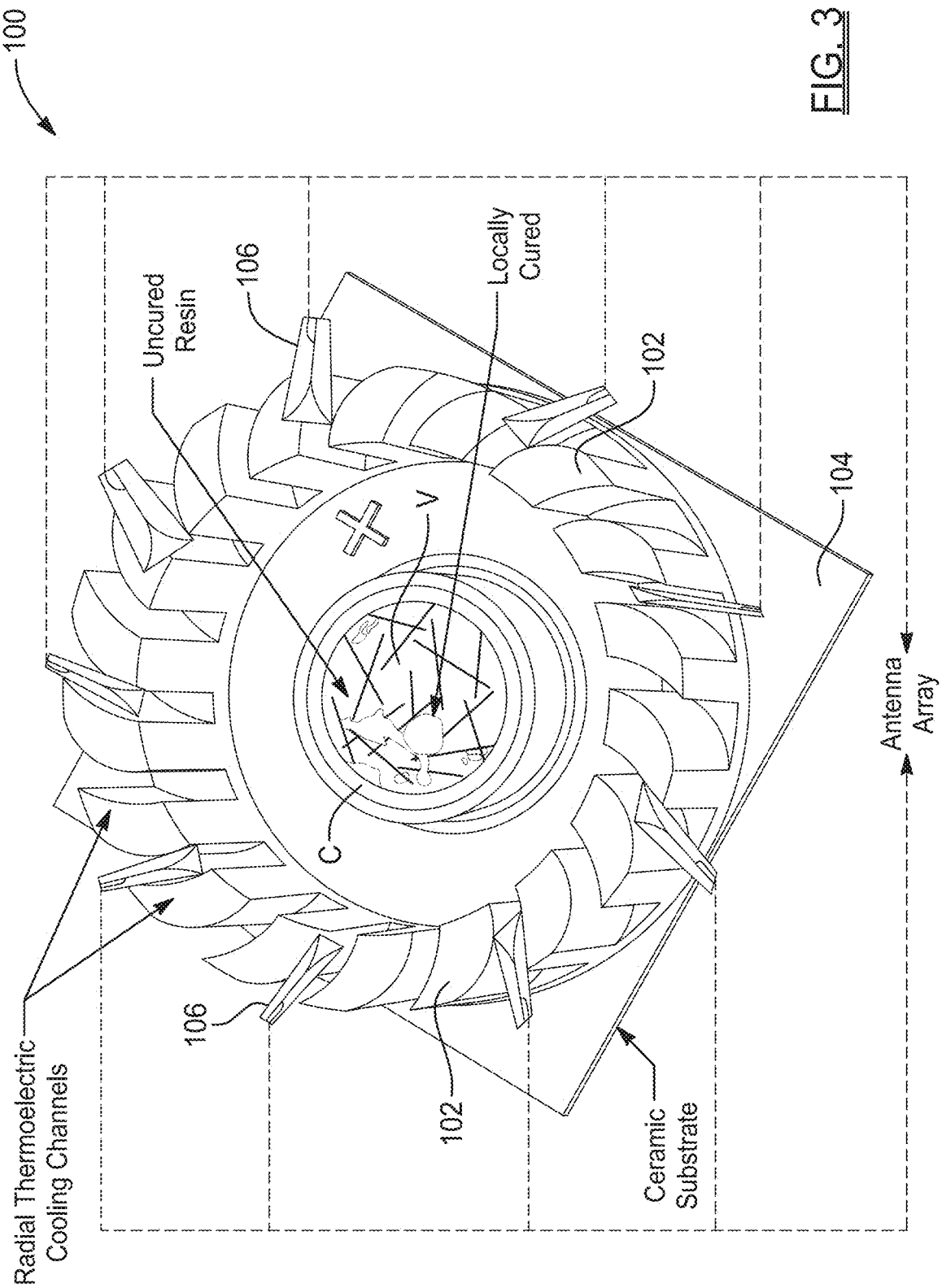
FIG. 3 is a perspective view of a subsystem for dynamic thermal cooling of the resin sample using a plurality of cooling elements, which in one form may be thermoelectric cooling modules, arranged circumferentially around the exterior of the build volume of resin, and interspersed with ones of the antennas of the microwave antenna array.

Referring to FIG. 3, another embodiment of the MAA 100 is shown. The MAA 100 is similar to the MAA 12 but also incorporates an integrated cooling subsystem formed using a plurality of circumferentially arranged and spaced apart cooling elements 102. The cooling elements 102 in one form may be passive cooling elements. In another implementation the cooling elements 102 may be active cooling elements formed by thermoelectric cooling devices. In either implementation, the cooling elements 102 may be shaped like cooling fins and may be radially spaced from the volume V of uncured resin. However, it will be appreciated that other non-circumferential layout arrangements are possible as well (e.g., square, rectangular, etc. around the build volume), and the precise layout of the cooling elements 102 may depend in part on the shape of the build volume. The cooling elements 102 in this example have an arcuate shape when viewed from above or in cross-section, and are supported from a thermally conductive substrate 104. In one configuration the cooling elements 102 extend perpendicularly outwardly from the substrate 104. Gaps are formed between adjacent pairs of the cooling elements 102 in which microwave antennas 106 may be positioned to be able to project microwave energy (e.g., such as beams 12a1-12i1 in FIG. 1). The microwave antennas 106 may be identical to the antennas 12a-12i shown in FIG. 1 or they may be of different construction, depending on the needs of a specific application. The thermally conductive substrate 104 in this example forms a planar substrate on which the container C, which contains the uncured volume V of resin, may be supported. The substrate 104 in one example is made from ceramic, although other thermally conductive materials such as fiber-reinforced polymer composites and polymer resins loaded with conductive particulates such as carbon black, iron and graphene nanofillers may be used as well, and the construction of the substrate 104 is not limited to one specific material or any specific shape. The substrate 104 may fixed or it may be rotationally supported and driven by a motor such as motor 28 shown in FIG. 1. In all of the above constructions, the substrate 104 and the cooling elements 102 operate to help channel excess heat away from the volume V of resin during a manufacturing operation.

Figure 4:
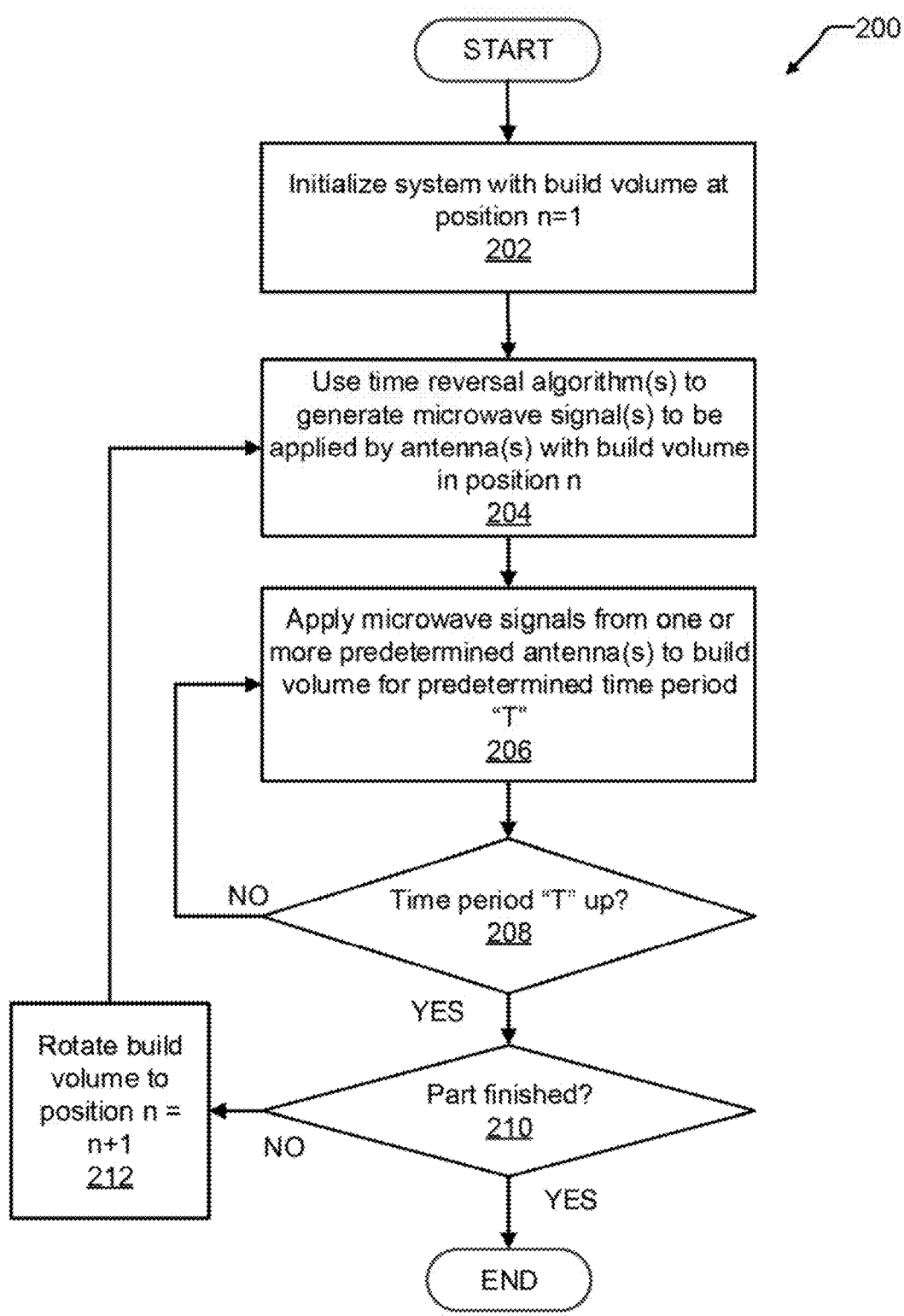
FIG. 4 is a high level flowchart illustrating one example of operations that may be performed by the system of FIG. 1 in forming a 3D part or structure in accordance with the teachings of the present disclosure.

Referring now to FIG. 4, a high level flowchart 200 is shown illustrating various operations that may be performed by the system 10 in forming the 3D structure S. The flowchart 200 assumes that the build volume will be rotated, but as noted hereinbefore, rotating the build volume is not necessary, and some implementations of the system are expected to use a stationary support substrate 26. At operation 202 the system 10 may be initialized with the build volume V positioned at position n=1. The time reversal beam steering algorithm 22 may be used to help generate microwave signals to be applied by one or more select ones of the antennas 102a-102i with the build volume in position n, as indicated at operation 204. At operation 206 the microwave signal(s) from one or more predetermined ones of the antennas 102a-102i may be applied to the volume of resin V within the container C, where the volume of resin V forms the build volume. At operation 208 a check is made by the electronic controller 18 if the time period "T" is up. The time period T is a predetermined exposure time to be applied to the volume V of the resin with the build volume in position n, however, if a single predetermined pulse is used to form each beam 12a1-12i1, then this operation of checking an exposure time duration may not be needed. If the time check made at operation 208 produces a "No" answer, then operations 206 and 208 are repeated. If the check at operation 208 produces a "Yes" answer, then the electronic controller 18 makes a check to determine if the part is finished, which may involve checking if the build volume has rotated through all of the positions where it needs to receive a microwave signal. If this check produces a "No" answer, then the stage 26 is rotated to the next position n=n+1 where the build volume will need to be exposed to a signal from a different one of the antennas 12a-12i. Operations 204-208 are then repeated. However, if the check at operation 210 indicates that the part is finished, then the forming process concludes.

A key advantage of the system 10 is its ability to enable volumetric processing of optically opaque materials. The system 10 enables optically opaque polymer resins to be solidified into precise, 3D structures and parts by microwave induced thermal crosslinking. Since microwave radiation will not affect the framework of the chemical molecule, this also leads to a faster reaction time (seconds) and high product yield, for example on the order of up to about 97% when compared with existing heat delivery methods. The suitable wavelengths of microwave fields interact uniformly with the reaction material leading to rapid volumetric heating over large areas without major thermal gradients or hotspots in the 3D structure. The volumetric processing of opaque particulate samples may include, but is not limited to, ceramic powders and graphene nanoparticles, which may be sintered using strictly microwave energy. Localized in-situ microwave heating of such samples under pressure in a press can also be performed to densify the particle working precursors and help to remove voids and other defects within the structure or part being formed.

A second novel component of this approach is the incorporation of cooling of the build volume through passive cooling elements or actively thermally controlled exterior surfaces of the build volume, or through appropriate selection of precursor particles used in the volume V of resin which forms the feedstock. As shown in FIG. 3, by dynamically removing thermal energy from the system, or controlling thermal conduction through precursor particle size, it is expected that thermally cured volumes can be smaller and better localized, relative to an object where thermal energy is left to dissipate through conduction of a volume of feedstock material of uniform density. Active cooling of surfaces may be accomplished through thermoelectric cooling modules, for example, arranged around the exterior of the build volume interspersed with the microwave antennas a microwave antenna array, as described above in connection with FIG. 3. By employing precursor materials in particle form (vs. liquid or monolithic solid form), heating can be spatially localized because the gas (or vacuum) surrounding each particle is a good thermal insulator relative to a solid or liquid. As particles melt and coalesce, their larger volume will more efficiently interact with microwaves, leading to preferential localized heating in these domains.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A volumetric additive manufacturing system for forming a structure from a volume of resin using microwave energy, the system comprising:
    an electronic controller;
    at least one beam forming algorithm accessible by the electronic controller for generating information relating to an amplitude and a time delay for forming a microwave signal to be used in irradiating a build volume, where the build volume is formed by the volume of resin;
    a microwave signal generating subsystem responsive to the information generated by the beam forming algorithm for generating the microwave signal using the amplitude and the time delay determined by the beam forming algorithm; and
    an antenna for receiving the microwave signal and projecting the microwave signal as a microwave beam, in accordance with the amplitude and time delay, into the build volume to form the structure.

2. The system of claim 1, wherein the microwave signal generating subsystem comprises a microwave pulse signal generator and amplifier subsystem.

3. The system of claim 2, wherein the microwave beam generated by the antenna provides an energy dose ranging from 100-700 mJ/cm3 in the build volume.

4. The system of claim 3, wherein the microwave pulse signal generator produces the microwave beam with a power level from 0.2-2 kW.

5. The system of claim 4, wherein the microwave beam emitted from the antenna has a resolution less than 1 cm.

6. The system of claim 1, wherein the build volume is supported on a fixed stage.

7. The system of claim 1, wherein the build volume is supported on a rotationally movable stage, and is movable between a plurality of positions to enable the build volume to be irradiated with microwave energy at a plurality of different angular positions relative to the antenna.

8. The system of claim 1, wherein the antenna comprises a microwave applicator array having a plurality of independent microwave antennas arranged in a predetermined pattern around the build volume, and wherein each one of said independent microwave antennas is able to emit a microwave energy signal with a specific amplitude and a specific time delay calculated by the beam forming algorithm in part with respect to its relation to its angular position relative to the build volume, to cure different portions of the build volume.

9. The system of claim 8, further comprising:
a stage;
an electric motor for moving the stage, and thus the build volume, rotationally between a plurality of predetermined positions; and
wherein each one of the independent microwave antennas emits its related said microwave energy signal toward the build volume when the build volume is orientated at specific predetermined positions relative to each one of said independent microwave antennas.

10. The system of claim 1, further comprising:
a support stage for supporting the build volume; and
a cooling subsystem operably associated with the support stage for controllably dissipating a quantity of heat from the build volume during formation of the structure.

11. The system of claim 10, wherein the cooling subsystem includes a plurality of cooling elements operably associated with the support stage and spaced apart from one another around the build volume, the cooling elements configured to thermally dissipate heat from the build volume.

12. The system of claim 11, wherein the cooling elements comprise thermoelectric cooling elements.

13. The system of claim 8, wherein the plurality of independent microwave antennas are fixedly arranged relative to the build volume in at least a partial circumferential arrangement circumscribing the build volume.

14. The system of claim 8, wherein the independent microwave antennas are operated simultaneously to all generate their respective said microwave energy signals substantially simultaneously.

15. The system of claim 8, where the independent microwave antennas are operated to generate their respective said microwave energy signals in a predetermined sequential sequence.

16. A volumetric additive manufacturing system for forming a structure using a volume of resin representing a build volume, the volume of resin being responsive to microwave energy exposure which thermally cures the resin, the system comprising:
an electronic controller;
a memory accessible by the electronic controller;
a beam forming algorithm stored in the memory for generating information relating to an amplitude and a time delay to be used in forming a plurality of microwave signals, where each one of the microwave signals is calculated by the beam forming algorithm taking into account an angular orientation at which each said microwave signal will be projected into the build volume;
a microwave signal generating subsystem responsive to the information generated by the beam forming algorithm for generating electrical pulses to be used in forming the plurality of microwave signals, wherein each one of said electrical pulses carries specific amplitude information and specific time delay information calculated by the beam forming algorithm; and
a microwave antenna array responsive to the electrical pulses, and configured to include a plurality of independent microwave antennas arranged at predetermined, specific angular orientations around the build volume, each one of said plurality of microwave antennas being configured to receive at least one of the electrical pulses and to project therefrom at least one of the plurality of microwave signals into the build volume to cure a portion of the volume of resin and form the structure.

17. The system of claim 16, wherein the plurality of microwave antennas of the microwave antenna array are arranged circumferentially around at least a portion of the build volume.

18. The system of claim 16, wherein the plurality of microwave antennas emit the plurality of microwave signals at the same time.

19. The system of claim 16, wherein the plurality of microwave antennas emit the plurality of microwave signals in a sequential, predetermined pattern.

20. The system of claim 16, further comprising:
a thermally conductive stage for supporting the build volume; and
a plurality of cooling elements supported on the thermally conductive stage and arranged around the build volume for dissipating heat generated within the build volume.

\* \* \* \* \*